Figure 1:
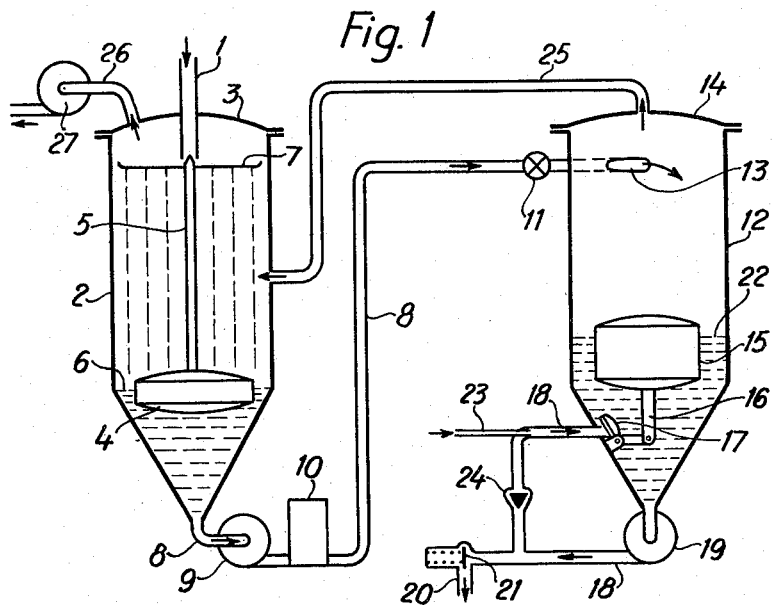

June 20, 1961  B. H. HALLSTRÖM  2,989,143
METHOD AND APPARATUS FOR REMOVING VOLATILE
SUBSTANCES FROM LIQUIDS
Filed Dec. 11, 1957

INVENTOR.
Bengt Hilding Hallström
BY
Davis, Hoxie & Faithfull
ATTORNEYS

United States Patent Office 2,989,143
Patented June 20, 1961

2,989,143
METHOD AND APPARATUS FOR REMOVING VOLATILE SUBSTANCES FROM LIQUIDS
Bengt Hilding Hallström, Lund, Sweden, assignor to Aktiebolaget Separator, Stockholm, Sweden, a corporation of Sweden
Filed Dec. 11, 1957, Ser. No. 702,016
Claims priority, application Sweden Dec. 13, 1956
13 Claims. (Cl. 183—2.5)

The present invention relates to a method and apparatus for removing volatile substances from liquids. For illustrative purposes, the invention will be described with particular reference to the deodorizing of cream intended for the production of butter, as the bad-smelling, volatile substances that may be contained in the cream would otherwise give the butter a bad flavor. However, the invention is also applicable to other uses such as the deodorization of milk, or fatty oils, or to processes for evaporating volatile organic solvents from extract solutions, or other similar distilling processes.

It is known, as shown, for example, by British Patent 712,479, now abandoned, to deodorize cream by blowing in steam through a perforated pipe at the bottom of a closed vessel containing a number of perforated disc insets over which the cream, while being atomized, flows down in counter-current to the steam. Because of the resulting large free liquid surface of the cream, the latter is brought into intimate contact with the steam, with the object of obtaining an effective deodorization. The bad-smelling gases thus liberated from the cream are conveyed by the steam from the vessel. It has been found, however, that the deodorization has not always been as effective as desired. Moreover, this method has the drawback that it is difficult to clean the disc insets effectively and to determine the degree of cleaning.

According to the present invention, the deodorization or de-gasing of the cream or liquid is accomplished effectively by accumulating a body of the liquid in a closed container or holding zone, circulating liquid from this body through a circuit which includes the holding zone and while maintaining a free liquid level in the zone, withdrawing gases from the liquid-free part of the holding zone above the free liquid level, and introducing gas or steam into the liquid in a part of the circuit which is kept under a higher pressure than that existing in the holding zone. An intimate mixture of liquid and bubbles of gas or steam will thus spurt into the container or holding zone. In practice, it has been found that such a circuit can be cleaned much more effectively than the above-mentioned disc insets, and this is probably due to the fact that in the pipe line forming the circuit, the entire cross section can be kept filled with rapidly flowing liquid.

The method according to the invention is well adapted to be carried out continuously, which, for obvious reasons, is advantageous.

The treated liquid can be discharged directly from the container or holding zone through an outlet situated below the liquid level. In practice, as when deodorizing cream, it is desirable, however, to operate with a vacuum in the container. In this case, a pump is required for sucking out the treated liquid. A pump is also needed in the circuit for circulating the liquid, and generally it is desirable to utilize this pump also for discharging the treated liquid. The treated liquid can then be discharged from the circuit at a point beyond the container but in advance of the point where gas or steam is introduced, reckoned in the direction of flow of the liquid.

According to a further feature of the invention, the efficiency of de-gasing is increased by circulating the liquid through the circuit at a volumetric rate which is several times greater than that of the liquid discharge from the circuit, as all the liquid is thus subjected to repeated de-gasing treatments.

The de-gasing may be further improved by introducing the gas or steam into the circuit under such a pressure that it is condensed or dissolved in the liquid, the container, however, being kept under a pressure lower than that at which the condensed or dissolved gas or steam is boiled off or liberated from the liquid.

If desired, the above-mentioned pump in the circuit can be eliminated by circulating the liquid through the circuit by means of an injector fed with the gas or steam introduced into the circuit.

The circulating liquid is preferably introduced into the container below the liquid level, as in this way the bubbles of gas or steam accompanying the liquid injected into the container will have the opportunity to come into contact also with the liquid accumulated in the container, thereby improving the de-gasing effect. This effect may also be improved by utilizing the gas or steam leaving the circuit for a preliminary de-gasing of the liquid to be treated, by being brought into contact with the liquid while it is in a finely divided state.

An apparatus made according to the invention comprises a circuit including a closed container having an inlet for the liquid to be treated and also having means, such as a float-regulated valve, for maintaining in the container a liquid level, a circulating pump inserted in the circuit, an inlet for gas or steam to the circuit, a throttling device in the circuit between the last-mentioned inlet and the container (reckoning in the direction of flow), an outlet from the circuit for discharging treated liquid, and means for discharging gas from the liquid-free part of the container above the liquid level.

In case the treated liquid is discharged from the circuit at a point where a super-atmospheric pressure is maintained, the liquid outlet may contain a valve operable to discharge the liquid when a certain pressure is exceeded. If there is a possibility that the gas or steam introduced into the circuit will flow in the direction opposite to the intended direction of flow, it may be necessary to provide a check valve in the circuit to prevent this.

Figure 2:
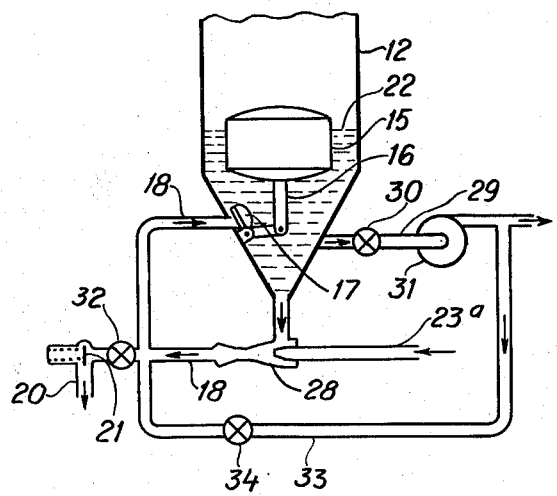

The invention is described more in detail in the following, reference being made to the attached drawing showing, diagrammatically, and by way of example, an installation suitable for deodorizing cream or milk, FIG. 1 representing the entire installation, while FIG. 2 represents a modified embodiment of the circuit only. In both figures, the corresponding details have the same reference numerals.

In FIG. 1, cream which is to be deodorized is assumed to enter through a pipe 1 into a closed container 2 with a cover 3. The latter is detachable, to make the interior of the container accessible for cleaning when required. Within the container 2 is a float 4 supporting a spindle 5 welded to the float, the upper part of this spindle forming a valve cone. In the highest possible position of the float, this valve cone closes the mouth of the pipe 1 entirely. The parts 4 and 5 thus serve to maintain a constant liquid level 6 in the container 2. A perforated bowl 7 is welded onto the upper part of the spindle 5. The cream flowing in from the pipe 1 is distributed in this bowl, which covers substantially the entire cross section of the interior of the container, and falls like a rain over the whole cross section of container 2, which may be referred to as a contacting zone.

A pipe line 8 leads from the bottom of the container 2 and includes a pump 9. The latter pumps the cream that has been accumulated at the bottom of the container throught a heater 10 where the cream is heated to pasteurizing temperature. From the heater 10, the cream is led through a throttling valve 11 in pipe line 8 before escaping in the form of a foam into a closed container 12 through a tangential inlet 13. From here the cream flows downward through a spiral path along the inner wall of the container 12 and is collected at the bottom of the container. The container 12 is provided with a cover 14 which, for the same reason as that given above, is also detachable. Furthermore, the container 12 is provided with a float 15 operatively connected to an adjustable valve flap or throttling device 17 through a lever system 16. The valve 17 throttles the mouth of a pipe line 18 opening into the container 12 above the bottom and leading from the bottom of this container. The pipe line 18 thus forms with the interior of the container 12 a closed circuit. A pump 19 in the pipe 18 forces the liquid to circulate in the circuit in a quantity per unit of time which is several times greater than the quantity per unit of time entering the container 12 through the inlet 13. In the pipe 18 is an outlet 20 regulated by a spring-loaded valve 21 adjusted to a suitable pressure. When the liquid in the container 12 has risen to the level 22 which is to be maintained constant, the valve flap 17 throttles the inlet from the pipe 18 so much that the pressure in the pipe 18 rises to the value at which the valve 21 is opened against its spring pressure, allowing cream to discharge through the outlet 20.

Steam is blown into the pipe 18 through a nozzle 23. The pressure in the pipe 18 is such that the steam, at the prevailing temperature, is condensed in the cream. The risk of the steam escaping through the pipe 18 in the direction toward the pump 19 is eliminated by a check valve 24 inserted in this pipe. The pressure maintained in container 12 is considerably lower than that in the pipe 18 and is preferably a vacuum. Consequently, as the cream flows into the container 12 through the valve or throttling device 17, a sudden generation of steam takes place in the cream so that water is boiled off from the cream in the form of innumerable small steam bubbles. According to FIG. 1, the steam bubbles also pass through a considerable part of the cream body at the bottom of the container, thus intensifying the deodorizing process. Also, from the cream flowing into the container 12 through the inlet 13, a certain quantity of water is boiled off due to the vacuum, this water quantity being in the form of innumerable steam bubbles and carrying with it the removable odorous substances of the cream. The vapours and gases thus generated are separated due to the centrifugal force resulting from the cream spiraling downward along the inner surface of the container 12, which may be referred to as a holding zone.

A vacuum pipe 25 leads from the container cover 14 and opens into the liquid-free part of the container 2. The vapours and gases entering the container 2 from this pipe pass upward through the container in counter-current to the cream drops falling down in the container 2, thus coming into intimate contact with these drops. In this way, a preliminary deodorization of the cream is effected as well as a pre-heating of the cream, a certain condensation of steam being obtained at the same time. The vapours and gases evaporated from the cream are finally sucked out through a pipe 26 in which a vacuum pump 27 is inserted. The steam pressure in the container 2 will thus be somewhat lower than that in the container 12.

In FIG. 2 I have shown a modification of the circuit associated with container 12. According to FIG. 2, the pump 19 of FIG. 1 is replaced by a steam injector 28 located in pipe 18 and fed by the steam nozzle 23a. If desired, the treated cream can be discharged directly from the container 12 through an outlet 29 regulated by a throttling valve 30. As it has been assumed that there is a vacuum prevailing in the container 12, a pump 31 is necessary to suck out the finished cream through discharge line 29. When the direct outlet 29 is used, the discharge 20 is closed by valve 32; and conversely, when discharge 20 is used, the outlet 29 is closed by valve 30.

It will be apparent that the float 15, because of its connection to valve 17, constitutes a means for maintaining in the container a liquid level 22 which is above the lower portion of container 12 from which pipe line 18 leads and which is also above the point at which pipe line 18 returns to this container. The vacuum pipe 25 constitutes a means communicating with container 12 above liquid level 22 for discharging gas from this container. When the outlet 29 is used the level 22 is maintained by means of liquid returned to container 12 through pipe line 33. The latter can be closed when necessary by means of a valve 34.

In the appended claims, the term "gas" is used in its broadest sense to include steam and other vapors which are readily condensible, as well as other aeriform fluids. Thus, the nozzle 23, which may be used to introduce other aeriform fluids than steam, is referred to as a gas inlet for the pipe line 18.

I claim:

1. A method of removing volatile substances from an aqueous liquid, which comprises the steps of maintaining in a closed holding zone a body of the liquid having a free liquid level located below the upper portion of said zone, circulating liquid from said body through a circuit in which liquid from said body is returned to the body through part of the circuit opening into said zone below said liquid level, introducing steam into the liquid at a portion of said circuit outside the holding zone while condensing the steam in said liquid and while maintaining said portion under a substantially higher pressure than the pressure in said zone, boiling off steam from the liquid by means of the pressure reduction to which the liquid is subjected when entering the holding zone from said portion of the circuit outside the holding zone, discharging steam from said upper portion of the holding zone above said level, withdrawing liquid from said circuit, and feeding liquid into said zone at a point above said liquid level to replace liquid withdrawn from said circuit.

2. A method according to claim 1, in which said liquid is withdrawn from the circuit at a point through which the circulating liquid passes from said zone to said portion wherein the steam is introduced.

3. A method according to claim 1, in which the liquid is circulated in the circuit by injecting said steam into the circuit.

4. A method according to claim 1, comprising also the steps of feeding the liquid before it is fed to the holding zone through a contacting zone in which the liquid is finely divided, and contacting said steam discharged from the holding zone with the finely divided liquid feed in said contacting zone, to effect preliminary de-gasing of the liquid.

5. Apparatus for removing volatile substances from a liquid, which comprises a closed container having an inlet for the liquid, a pipe line leading from the lower portion of the container and returning to said lower portion of the container to form therewith a circuit, a pump in said pipe line for circulating liquid therethrough, means for maintaining in the container a liquid level above said lower portion thereof but below said inlet, said pipe line having a steam inlet, a throttling device which is located in the pipe line to impose a back pressure on the pump and through which liquid in the circuit returns to the container from said steam inlet, whereby steam from said steam inlet is introduced into the circulating liquid at a pressure substantially higher than the pressure in said container, the circuit having an outlet for treated liquid, and means communicating with the container above said liquid level for discharging steam and gas from the container.

6. Apparatus according to claim 5, in which said circuit outlet is located at a point of said pipeline through which the liquid passes on its way from the container to said steam inlet.

7. Apparatus according to claim 5, in which said pump is an injector forming said steam inlet of the pipe line.

8. Apparatus according to claim 5, comprising also a valve located in said circuit outlet and operable to discharge liquid through the outlet when the pressure in the pipe line exceeds a predetermined value.

9. Apparatus according to claim 5, in which said throttling device is adjustable, said means for maintaining the liquid level including a float in the container operatively connected to the throttling device for adjusting the same to increase the pressure in said pipe line in response to an increase in said liquid level, and a valve located in said circuit outlet and operable to discharge liquid through said outlet in response to an increase of said pipe line pressure above a predetermined value.

10. Apparatus according to claim 5, comprising also a check valve located in said pipe line and through which the liquid flows from the container to said steam inlet.

11. A method according to claim 1, in which the untreated liquid is fed tangentially into the liquid-free part of the holding zone.

12. Apparatus according to claim 5, in which said liquid inlet opens tangentially into the container above said liquid level.

13. Apparatus according to claim 5, in which said throttling device is a float-operated valve.

References Cited in the file of this patent

UNITED STATES PATENTS

| | | |
|---|---|---|
| 1,628,900 | Nielsen | May 17, 1927 |
| 1,969,888 | Gibson | Aug. 14, 1934 |
| 2,580,791 | Kahn | Jan. 1, 1952 |
| 2,664,170 | Walker et al. | Dec. 29, 1953 |

FOREIGN PATENTS

| | | |
|---|---|---|
| 465,486 | Germany | Sept. 19, 1928 |
| 638,198 | Great Britain | May 31, 1950 |